United States Patent
Betts et al.

(10) Patent No.: US 7,908,598 B2
(45) Date of Patent: Mar. 15, 2011

(54) AUTOMATED CREATION OF MODEL AND VIEW CODE

(75) Inventors: Christopher Betts, Mt. Dandenong (AU); Trudi L. Ersvaer, Preston (AU)

(73) Assignee: Computer Associates Think, Inc., Islandia, NY (US)

( * ) Notice: Subject to any disclaimer, the term of this patent is extended or adjusted under 35 U.S.C. 154(b) by 1210 days.

(21) Appl. No.: 11/534,083

(22) Filed: Sep. 21, 2006

(65) Prior Publication Data

US 2007/0073763 A1 Mar. 29, 2007

Related U.S. Application Data

(60) Provisional application No. 60/720,320, filed on Sep. 23, 2005.

(51) Int. Cl.
*G06F 9/44* (2006.01)
*G06F 9/45* (2006.01)

(52) U.S. Cl. ......... 717/165; 717/108; 717/109; 717/113; 717/116; 717/163

(58) Field of Classification Search .................. None
See application file for complete search history.

(56) References Cited

U.S. PATENT DOCUMENTS 7,150,015 B2 * 12/2006 Pace et al. ...................... 717/176
2005/0132323 A1 * 6/2005 Huerta et al. .................. 717/100

FOREIGN PATENT DOCUMENTS

WO WO 2004/031945 10/2002
WO WO 2004/086222 3/2003

OTHER PUBLICATIONS

PCT Notification of Transmittal of the International Search Report and the Written Opinion of the International Searching Authority, or the Declaration; Int'l application No. PCT/US2006/037122; 14 pages, Apr. 25, 2007.
Iona Manolescu et al., "Model-Driven Design and Deployment of Service-Enabled Web Applications;" XP007902048; ACM Transactions on Internet Technology; vol. 5, No. 3, pp. 439-479, Aug. 2005.
S. Ceri, et al.; "Architectural Issues and Solutions in the Development of Data-Intensive Web Applications;" XP007902050; Dipartimento di Elettronica, Apr. 13, 2007.

* cited by examiner

*Primary Examiner* — Chuck O Kendall
(74) *Attorney, Agent, or Firm* — Baker Botts L.L.P.

(57) ABSTRACT

A method for generating computer code includes automatically generating a data structure based on a data description. Automatically generating a user interface based on the data description. Automatically generating linking code for linking the generated data structure, the user interface and control code.

48 Claims, 3 Drawing Sheets

AUTOMATED CREATION OF MODEL AND VIEW CODE

CROSS REFERENCE TO RELATED APPLICATIONS

This application claims priority to U.S. Provisional Patent Application Ser. No. 60/720,320 entitled "AUTOMATED CREATION OF MODEL AND VIEW CODE," which was filed on Sep. 23, 2005, which is hereby incorporated herein by reference.

TECHNICAL FIELD OF THE INVENTION

The present disclosure relates to model and view code and, more specifically, to the automatic creation of model and view code.

BACKGROUND OF THE INVENTION

The Model View Controller (MVC) Pattern is an architecture for designing software where the software may be designed as three distinct components: data model, view model and controller. The data model may be used to detail any data objects that may be used by the software under design. For example, the data model may determine how information is stored and utilized by the software under design. The view model may be used to establish a user interface. For example, the view model may provide a graphical interface that communicates information with the user. The controller may handle the functional logic of the software under design. For example, where the software under design is a business application, the controller may provide the business logic utilized to provide the functionality of the program.

The MVC provides multiple advantages. For example, MVC allows for separation of concerns. Separation of concerns is the ability for programmers or groups of programmers to each work on one of the distinct components of the software under design. For example, a programmer who has special skills relating to data modeling may program the data model, while a second programmer who has special skills relating to user interfaces may program the view model and a programmer who has special skills relating to business logic may program the controller.

Moreover, as revisions are made to the software under design, revisions may be made to a single component without damaging the other components. For example, user interface code may undergo frequent and often dramatic revision. Separating the view model from the rest of the software under design allows for the user interface to be more easily revised with less of a likelihood of damaging other aspects of the software in the process.

While MVC may be implemented on a large number of platforms, Jakarta Struts is a popular web oriented MVC implementation. Jakarta Struts, owned by the Apache Foundation, is an open-source framework for developing J2EE web applications. Jakarta Struts is more fully described at http://jakarta.apache.org/struts/ which is herein incorporated by reference.

The MVC components may be developed, for example, by manually programming. Manual programming may rely on one or more programmers to produce the code by hand. Manual programming can be tedious and repetitive and is therefore prone to error. Moreover, certain changes to one MVC component may necessitate changing the other components. Even a relatively trivial change to one component may necessitate an overhaul of all three components. For example, changing a data field from "Christian Name" to "First Name" in the data model may necessitate implementing a corresponding change in both the view model and the controller.

This problem may be particularly acute when designing web services programs. Web services are systems for providing particular functionality over a computer network, for example, the Internet. Many web services are accessible using a standard web browser and therefore provide platform-independent functionality to the user. Web services programs often utilize tightly defined data formats. These data formats may be defined by an XML schema document. The XML schema document may set out exactly how data is to be used in the program.

It is therefore advantageous to utilize tools to automatically generate as much of the MVC components as possible so that there will be reduced opportunity for introducing error when designing or modifying components.

Existing tools may be used to provide a degree of automated code generation from the XML schema documents. For example, Castor from castor.org and JAXB from sun.com provide for the automatic creation of JAVA classes from XML schema. These JAVA classes may then be used to provide programmers with an automated translation of XML data into data structures that can more easily be integrated into computer programs.

Other tools exist for constructing XML descriptions from existing server code. For example, Apache Axis and Microsoft .NET have this functionality. These platforms may create web service description language (WSDL) files from an existing server code base. However, these tools are not able to automatically generate server code from XML descriptions.

Therefore it is desirable to be able to automatically generate code, for example MVC components, from XML descriptions.

SUMMARY OF THE INVENTION

A method for generating computer code includes automatically generating a data structure based on a data description. Automatically generating a user interface based on the data description. Automatically generating linking code for linking the generated data structure, the user interface and control code.

A system for generating computer code includes a data-structure-generation unit for automatically generating a data structure based on a data description. A user interface-generation unit for automatically generating a user interface based on the data description. A linking-code-generation unit for automatically generating linking code for linking the generated data structure, the user interface and control code.

A computer system includes a processor and a program storage device readable by the computer system, embodying a program of instructions executable by the processor to perform method steps for generating computer code. The method includes automatically generating a data structure based on a data description. Automatically generating a user interface based on the data description. Automatically generating linking code for linking the generated data structure, the user interface and control code.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
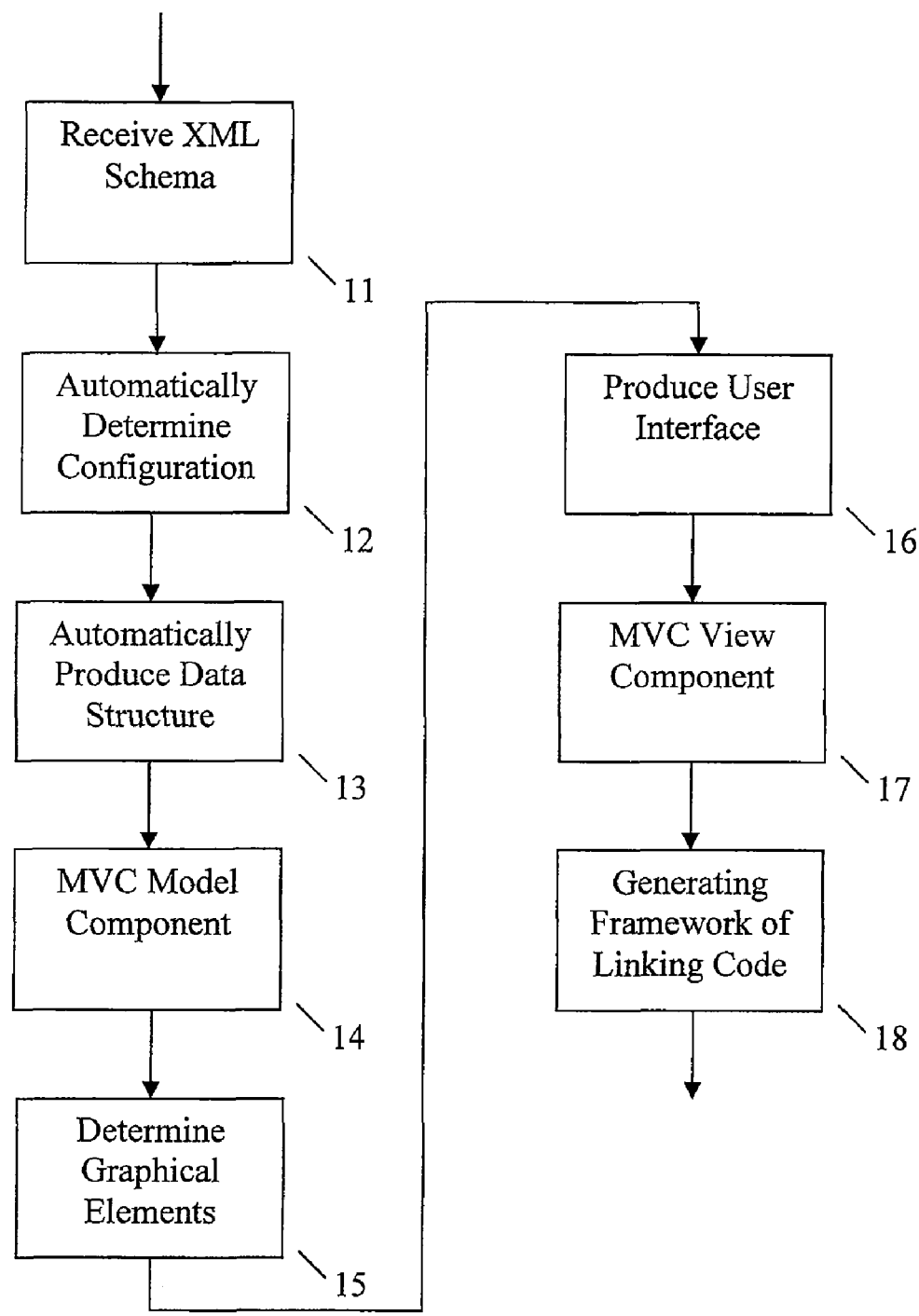
FIG. 1 is a flow chart illustrating an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure may be used to automatically generate code, for example MVC components, from XML descriptions. For example, embodiments of the present disclosure may be used to automatically generate and integrate view and model components. Additionally, embodiments of the present invention may be used to automatically integrate the automatically generated view and model components into a controller, for example, using data objects. The data objects may be, for example, Struts data beans.

In describing embodiments of the present disclosure, examples may utilize Apache's Jakarta Struts, for example with Velocity templating, JAXB and traditional RDBMS databases. However, it is to be understood that the embodiments of the present disclosure may be implemented using any platform.

In the co-pending application AUTOMATED CREATION OF WEB GUI FOR XML SERVERS, by Dr. Betts et al., Ser. No. 11/132,648, filed May 19, 2005, which is herein incorporated by reference, the automatic generation of a graphical user interface is disclosed. In the co-pending application AUTOMATED WEB PAGE TO XML TRANSLATION SERVERS, by Dr. Betts et al., Ser. No. 11/132,703 filed May 19, 2005, which is herein incorporated by reference, the automatic creation of translation servers is disclosed. These techniques may be utilized by embodiments of the present disclosure to take an XML schema and generate a user interface, for example an HTML based user interface. These techniques may be used by embodiments of the present disclosure to generate graphical elements of the GUI that are appropriately matched to the various data types defined by the XML schema. These graphical elements may be combined with default layout rules to automatically create a user-interactive view of a data object. This user-interactive view can then be utilized as a view model.

XML data may be automatically stored in a directory. The structure of the directory may be generated based on the XML data schema. For example, this may be accomplished by using the techniques disclosed in the co-pending application EFFICIENT STORAGE OF XML IN A DIRECTORY, by Dr. Betts et al., Ser. No. 10/888,736, filed Jul. 9, 2004, which is herein incorporated by reference. Similarly, XML data may be automatically stored in a RDBMS, either as an unstructured collection of data, or as an extension of the directory method. In the extension of the directory method, the data is saved in structured RDBMS tables using a metadata scheme. For example, atomic elements may be saved as XPath and value pairs. The automatically generated data structure may then be utilized as the data model.

The automatically generated view and data models may incorporate one or more default rules. These default rules may specify specifics for generating the graphical elements and data structure. For example, the default rules may provide the aesthetic design of the graphical elements. For example, the default rules may provide a model data repository. These default rules may be derived by analyzing the XML schema. For example, they may be derived by compiling the XML schema.

The above-described automatically generated view model and data model may then be automatically integrated (linked), for example, using standard data objects. For example, data objects passed between the view model and the data model may be coordinated. Both the view model and the data model may be generated to provide receptacles for data in a particular format. By ensuring that the data objects passed are compatible with both the data model and the view model, it may be ensured that data objects read from storage can be used by the user interface of the view model without conversion and that the data objects modified by the user interface may be stored without conversion.

As stated above, the control code may contain the program logic of the software under design. The control code may be programmed manually. The data objects may then be linked with the control code. This may be accomplished, for example, by automatically establishing a framework that makes the data objects readily available to the programmer programming the control code.

FIG. 1 is a flow chart illustrating an embodiment of the present disclosure. An XML schema may be provided (Step S11). The XML schema may be a description of the data the program under design is to utilize. For example, the XML schema may define data types. The description may be automatically parsed to determine a corresponding configuration (Step S12). For example, the corresponding configuration may be determined by matching schema derived data names of the description and a selection of configurations. The determined configuration may be used to automatically produce a data structure (Step S13). The data structure may be used as a MVC model component (Step S14). The description may be automatically parsed to determine corresponding graphical elements (Step S15). For example, the corresponding graphical elements may be determined by matching schema derived data names of the description and a selection of graphical elements. The graphical elements may be combined to automatically produce a user interface (Step S16). The user interface may be used as a MVC view component (Step S17).

The model and view components may be linked by automatically generating a framework of linking code (Step S18). The framework of linking code may include a place holder for a MVC control component. This may allow for the control component to be automatically linked within the framework of linking code.

The precise method for generating the control component does not affect the execution of embodiments of the present disclosure. For example, the control component may be manually programmed or taken from an existing program.

Figure 2:
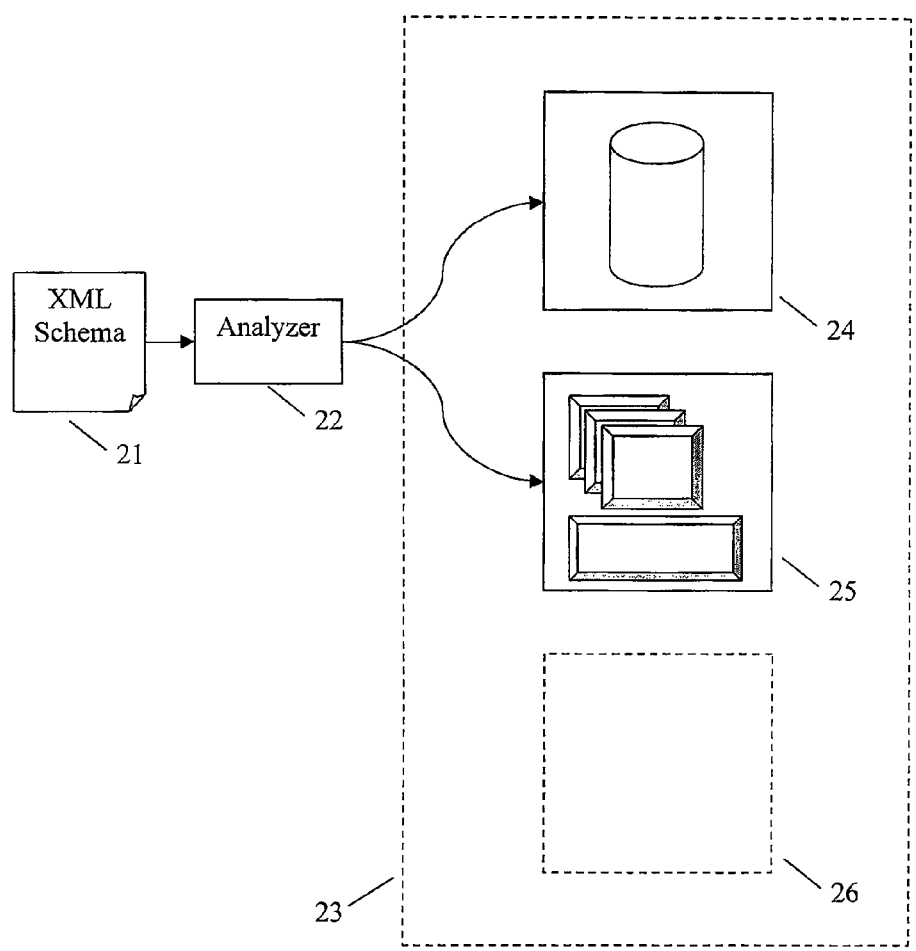
FIG. 2 is a block diagram showing an apparatus for automatically generating code according to an embodiment of the present disclosure.

FIG. 2 is a block diagram showing an apparatus for automatically generating code according to an embodiment of the present disclosure. A data description, for example an XML schema 21 may be analyzed, for example using an analyzer 22, to automatically generate a data structure 24. The XML schema 21 may also be analyzed, for example using the analyzer 22, to automatically generate a user interface 25. Linking code 23 may then be generated to integrate the data structure 24 and the user interface 25. The linking code 23 may also link a placeholder for a controller 26 so that a controller may be easily and/or automatically integrated into the linking code 23.

Figure 3:
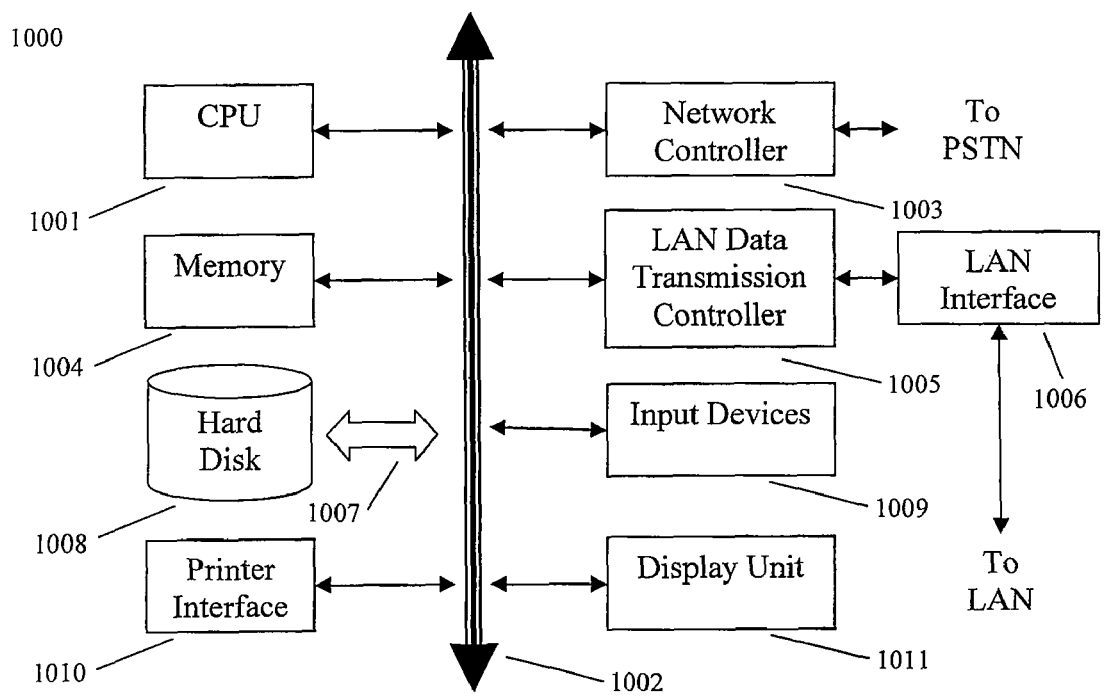
FIG. 3 shows an example of a computer system capable of implementing the method and apparatus according to embodiments of the present disclosure.

FIG. 3 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for generating computer code, comprising:
   automatically generating a data structure based on a data description;
   automatically generating a user interface based on the data description; and
   automatically generating linking code for linking the generated code data structure and the user interface, the linking code also linking a placeholder for control code that is manually created by a developer.

2. The method of claim 1, wherein the data description is an XML schema.

3. The method of claim 1, wherein the data structure is a Model View Controller (MVC) model component.

4. The method of claim 1, wherein the data structure comprises a model data repository.

5. The method of claim 4, wherein the model data repository comprises tables in an RDBMS .

6. A method for generating computer code, comprising:
   automatically generating a data structure based on a data description;
   automatically generating a user interface based on the data description; and
   automatically generating linking code for linking the generated code, and
   wherein the data structure comprises a model data repository, and
   wherein the model data repository comprises a schema in a Lightweight Directory Access Protocol (LDAP) directory.

7. The method of claim 1, wherein the step of automatically generating a data structure based on a data description comprises:
   using the data description to create data objects; and
   automatically generating the data structure to accommodate the data objects.

8. The method of claim 7, wherein the data objects are Struts data beans.

9. The method of claim 1, wherein the user interface comprises a Model View Controller (MVC) view component.

10. The method of claim 1, wherein the step of automatically generating a user interface based on the data description comprises:
    using the data description to create data objects; and
    automatically generating the user interface by assembling user interface components corresponding to the data objects.

11. The method of claim 10, wherein the data objects are Struts data beans.

12. The method of claim 1, wherein the control code is a Model View Controller (MVC) control component.

13. The method of claim 1, wherein the control code is manually programmed.

14. A system for generating computer code, comprising:
    a memory comprising a directory for storing a data structure; and
    an analyzer comprising at least one central processing unit, the analyzer comprising:
    a data-structure-generation unit for automatically generating a data structure based on a data description;
    a user-interface-generation unit for automatically generating a user interface based on the data description; and
    a linking-code-generation unit for automatically generating linking code for linking the generated code data structure and the user interface, the linking code also linking a placeholder for control code that is manually created by a developer code.

15. The system of claim 14, wherein the data description is an XML schema.

16. The system of claim 14, wherein the data structure is a Model View Controller (MVC) model component.

17. The system of claim 14, wherein the data structure comprises a model data repository.

18. The system of claim 17, wherein the model data repository comprises tables in an RDBMS.

19. The system of claim 17, wherein the model data repository comprises a schema in a Lightweight Directory Access Protocol (LDAP) directory.

20. The system of claim 14, wherein the data structure-generation unit comprises:
    a data-object-creation unit for using the data description to create data objects; and
    an accommodating-data-structure-generating unit for automatically generating the data structure to accommodate the data objects.

21. The system of claim 20, wherein the data objects are Struts data beans.

22. The system of claim 14, wherein the user interface comprises a Model View Controller (MVC) view component.

23. The system of claim 14, wherein the user interface-generation unit comprises:
    an object-creation unit for using the data description to create data objects; and
    an assembling-user-interface-generation unit for automatically generating the user interface by assembling user interface components corresponding to the data objects.

24. The system of claim 23, wherein the data objects are Struts data beans.

25. The system of claim 14, wherein the control code is a Model View Controller (MVC) control component.

26. The system of claim 14, wherein the control code is manually programmed.

27. A computer system comprising:
a processor; and
a program storage device readable by the computer system, embodying a program of instructions executable by the processor to perform method steps for generating computer code, the method comprising:
automatically generating a data structure based on a data description;
automatically generating a user interface based on the data description; and
automatically generating linking code for linking the generated code data structure and the user interface, the linking code also linking a placeholder for control code that is manually created by a developer code.

28. The computer system of claim 27, wherein the data description is an XML schema.

29. The computer system of claim 27, wherein the data structure is a Model View Controller (MVC) model component.

30. The computer system of claim 27, wherein the data structure comprises a model data repository.

31. The computer system of claim 30, wherein the model data repository comprises tables in an RDBMS.

32. The computer system of claim 30, wherein the model data repository comprises a schema in a Lightweight Directory Access Protocol (LDAP) directory.

33. The computer system of claim 27, wherein the step of automatically generating a data structure based on a data description comprises:
using the data description to create data objects; and
automatically generating the data structure to accommodate the data objects.

34. The computer system of claim 33, wherein the data objects are Struts data beans.

35. The computer system of claim 27, wherein the user interface comprises a Model View Controller (MVC) view component.

36. The computer system of claim 27, wherein the step of automatically generating a user interface based on the data description comprises:
using the data description to create data objects; and
automatically generating the user interface by assembling user interface components corresponding to the data objects.

37. The computer system of claim 36, wherein the data objects are Struts data beans.

38. The computer system of claim 27, wherein the control code is a Model View Controller (MVC) control component.

39. The computer system of claim 27, wherein the control code is manually programmed.

40. The method of claim 1, wherein automatically generating the data structure comprises:
analyzing an XML schema defining a plurality of data types; and
identifying at least one default rule specifying an aesthetic design for generating a graphical element of the user interface.

41. The method of claim 40, wherein generating the user interface comprises matching at least one graphical element with at least one data type defined by the XML schema.

42. The method of claim 1, wherein the data structure and the user interface are generated using a common data object of a common format such that the data object is compatible with both the data model and the view model.

43. The system of claim 14, wherein the data-structure-generation unit for automatically generating the data structure is operable to:
analyze an XML schema defining a plurality of data types; and
identify at least one default rule specifying an aesthetic design for generating a graphical element of the user interface.

44. The system of claim 43, wherein the user-interface-generation unit for automatically generating the user interface is operable to:
generate the user interface comprises matching at least one graphical element with at least one data type defined by the XML schema.

45. e system of claim 14, wherein the data structure and the user interface are generated using a common data object of a common format such that the data object is compatible with both the data model and the view model.

46. The computer system of claim 27, wherein automatically generating the data structure comprises:
analyzing an XML schema defining a plurality of data types; and
identifying at least one default rule specifying an aesthetic design for generating a graphical element of the user interface.

47. The computer system of claim 46, wherein generating the user interface comprises matching at least one graphical element with at least one data type defined by the XML schema.

48. The computer system of claim 27, wherein the data structure and the user interface are generated using a common data object of a common format such that the data object is compatible with both the data model and the view model.

* * * * *